United States Patent
Boudreau et al.

(10) Patent No.: US 9,934,369 B2
(45) Date of Patent: Apr. 3, 2018

(54) DETECTING AND TRACKING VIRTUAL CONTAINERS

(71) Applicant: INTERNATIONAL BUSINESS MACHINES CORPORATION, Armonk, NY (US)

(72) Inventors: Michael K. Boudreau, Orange, CA (US); Blair Googer, Georgetown, SC (US); Jamie B. Marsnik, Annandale, MN (US); Bradley T. Moore, Laguna Niguel, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/212,435

(22) Filed: Jul. 18, 2016

(65) Prior Publication Data

US 2017/0199990 A1   Jul. 13, 2017

Related U.S. Application Data

(63) Continuation of application No. 14/990,182, filed on Jan. 7, 2016, now Pat. No. 9,396,251.

(51) Int. Cl.
G06F 17/30 (2006.01)
G06F 21/10 (2013.01)

(52) U.S. Cl.
CPC ...... *G06F 21/105* (2013.01); *G06F 17/30557* (2013.01); *G06F 17/30595* (2013.01); *G06F 2221/0773* (2013.01)

(58) Field of Classification Search
None
See application file for complete search history.

(56) References Cited

U.S. PATENT DOCUMENTS

| | | | | |
|---|---|---|---|---|
| 7,631,006 B2* | 12/2009 | Hagstrom | ............ | G06F 8/20 |
| 7,793,265 B2* | 9/2010 | Alpern | ............ | G06F 17/30067 |
| | | | | 717/127 |
| 7,793,266 B2* | 9/2010 | Alpern | ............ | G06F 3/0613 |
| | | | | 717/127 |
| 8,219,987 B1* | 7/2012 | Vlaovic | ............ | G06F 9/44 |
| | | | | 717/148 |
| 8,392,902 B2* | 3/2013 | Reinz | ............ | G06F 8/67 |
| | | | | 250/363.02 |

(Continued)

OTHER PUBLICATIONS

List of IBM Patents or Patent Applications Treated as Related; Date Filed: Sep. 8, 2016, p. 1-2.

*Primary Examiner* — Hung Le
(74) *Attorney, Agent, or Firm* — Fletcher Yoder PC

(57) ABSTRACT

Examples of techniques for detecting and tracking virtual containers are disclosed. In one example implementation according to aspects of the present disclosure, a computer-implemented method includes detecting a virtual container. The method further includes collecting virtual container data for the virtual container. The method also includes associating, by a processing device, the virtual container to at least one of a plurality of images. Additionally, the method includes building, by the processing device, a container event database based on the virtual container data and the association of the virtual container to the at least one of the plurality of images, so as to enable tracking of software in the plurality of images and in live virtual containers.

20 Claims, 8 Drawing Sheets

(56) References Cited

U.S. PATENT DOCUMENTS

| | | | | |
|---|---|---|---|---|
| 8,689,224 | B2* | 4/2014 | Hotra | G06F 21/51 |
| | | | | 710/6 |
| 9,389,931 | B1* | 7/2016 | Bhudavaram | G06F 9/543 |
| 9,396,251 | B1 | 7/2016 | Boudreau et al. | |
| 9,594,590 | B2* | 3/2017 | Hsu | G06F 9/4856 |
| 2004/0128250 | A1* | 7/2004 | Fox | G06Q 30/0601 |
| | | | | 705/52 |
| 2006/0218521 | A1* | 9/2006 | Hagstrom | G06F 8/20 |
| | | | | 717/101 |
| 2008/0301140 | A1* | 12/2008 | Alpern | G06F 17/30067 |
| 2008/0301676 | A1* | 12/2008 | Alpern | G06F 8/65 |
| | | | | 718/1 |
| 2010/0064299 | A1* | 3/2010 | Kacin | G06F 9/45537 |
| | | | | 719/317 |
| 2010/0125477 | A1* | 5/2010 | Mousseau | G06F 9/5072 |
| | | | | 717/177 |
| 2014/0164326 | A1* | 6/2014 | Slater | G06F 11/1453 |
| | | | | 707/624 |
| 2015/0120928 | A1* | 4/2015 | Gummaraju | H04L 67/1008 |
| | | | | 709/226 |
| 2015/0178497 | A1* | 6/2015 | Lukacs | G06F 9/461 |
| | | | | 726/23 |
| 2016/0098285 | A1* | 4/2016 | Davis | G06F 9/45545 |
| | | | | 718/1 |
| 2016/0274928 | A1* | 9/2016 | Linton | G06F 9/45558 |
| 2016/0378563 | A1* | 12/2016 | Gaurav | G06F 9/5077 |
| | | | | 718/1 |
| 2017/0093921 | A1* | 3/2017 | Duan | H04L 63/20 |
| 2017/0098092 | A1* | 4/2017 | Nachenberg | G06F 21/62 |

* cited by examiner

| Image ID | Container ID | Action | Time | Mapped Component | License Quantity |
|---|---|---|---|---|---|
| dc460f045d20 | 594d4cf8bcd0 | Create | 10:00:00 AM | WebSphere Enterprise | 0 |
| dc460f045d21 | 594d4cf8bcd0 | Start | 10:01:00 AM | WebSphere Enterprise | 1 |
| dc460f045d22 | 594d4cf8bcd0 | Stop | 10:05:00 AM | WebSphere Enterprise | 0 |
| dc460f045d22 | 594d4cf8bcd0 | Destroy | 10:05:00 AM | WebSphere Enterprise | 0 |
| 8e4531928f57 | 24b0ee192c01 | Create | 10:10:00 AM | DB2 Enterprise | 0 |
| 8e4531928f57 | 24b0ee192c01 | Start | 10:15:00 AM | DB2 Enterprise | 0 |
| dc460f045d25 | d5b3657f02bf | Create | 10:20:00 AM | WebSphere Enterprise | 0 |
| dc460f045d25 | d5b3657f02bf | Start | 10:20:00 AM | WebSphere Enterprise | 1 |
| dc460f045d25 | 81eded61d01f | Create | 10:21:00 AM | WebSphere Enterprise | 1 |
| dc460f045d26 | 81eded61d01f | Start | 10:21:00 AM | WebSphere Enterprise | 2 |
| dc460f045d27 | d5b3657f02bf | Stop | 1:00:00 PM | WebSphere Enterprise | 1 |
| dc460f045d28 | 81eded61d01f | Stop | 5:00:00 PM | WebSphere Enterprise | 0 |
| 8e4531928f57 | 24b0ee192c01 | Stop | 5:00:00 PM | DB2 Enterprise | 0 |

*FIG. 6*

DETECTING AND TRACKING VIRTUAL CONTAINERS

DOMESTIC PRIORITY

This application is a continuation of U.S. patent application Ser. No. 14/990,182, filed Jan. 7, 2016, the disclosure of which is incorporated by reference herein in its entirety.

BACKGROUND

The present disclosure relates generally to software management and, more particularly, to detecting and tracking virtual containers and building a database of associations among the containers, container histories, and installable components.

Current techniques for software license management scan for software on systems periodically (e.g., once per year) using file and registry based systems. These techniques rely on licensable software components being visible to the scanning tool. It may take weeks or months to reconcile an environment, which may be acceptable in environments with licensing postures that are unlikely to change during the reconciliation. However, software asset management (SAM) processes and tools have not evolved to adequately detect and track software licenses in a cloud environment, which may utilize rapid and API driven provisioning, de-provisioning, and auto-scaling.

Moreover, existing SAM processes and tools do not adequately handle containerization techniques used in cloud computing. Containers provide the ability for software applications to be licensable in predefined container templates known as images. These images can be checked into a repository and run, as containers, on computing hosts. For example, a user can create, run, and destroy a licensable unit of software, which would go undetected by traditional SAM processes. Additionally, images can be created and recreated in many different ways, which makes it more difficult to identify future images that might run in an environment.

Container-enabled computing hosts that are capable of running containers based on image templates utilize container engines to create, start, stop, and destroy containers. Even using a container cluster, each host utilizes its own container engine to report on container-related events.

SUMMARY

In accordance with aspects of the present disclosure, a computer-implemented method for detecting and tracking virtual containers is provided. The method includes detecting a virtual container. The method further includes collecting virtual container data for the virtual container. The method also includes associating, by a processing device, the virtual container to at least one of a plurality of images. Additionally, the method includes building, by the processing device, a container event database based on the virtual container data and the association of the virtual container to the at least one of the plurality of images, so as to enable tracking of software in the plurality of images and in live virtual containers.

In accordance with additional aspects of the present disclosure, a system for detecting and tracking virtual containers is provided. The system includes a processor in communication with one or more types of memory. The processor is configured to detect a virtual container. The processor is further configured to collect virtual container data for the virtual container. The processor is also configured to associate the virtual container to at least one of a plurality of images. Additionally, the processor is configured to build a container event database based on the virtual container data and the association of the virtual container to the at least one of the plurality of images, so as to enable tracking of software in the plurality of images and in live virtual containers.

In accordance with yet additional aspects of the present disclosure, a computer program product for detecting and tracking virtual containers is provided. The computer program product comprises a non-transitory storage medium readable by a processing circuit and storing instructions for execution by the processing circuit for performing a method. The method includes detecting a virtual container. The method further includes collecting virtual container data for the virtual container. The method also includes associating, by a processing device, the virtual container to at least one of a plurality of images. Additionally, the method includes building, by the processing device, a container event database based on the virtual container data and the association of the virtual container to the at least one of the plurality of images, so as to enable tracking of software in the plurality of images and in live virtual containers.

In accordance with other aspects of the present disclosure, a computer-implemented method for detecting and tracking virtual containers is provided. The method includes detecting, by a processing device, a virtual container event. The method also includes creating a virtual container record in a database. The method further includes detecting, by the processing device, a start event of the virtual container and recording a start time of the start event in the database. Additionally, the method includes detecting, by the processing device, a stop event of the virtual container and recording a stop time of the stop event in the database. Finally, the method includes presenting the database as an event log, so as to enable tracking of software in a plurality of images and in live virtual containers.

In accordance with yet additional aspects of the present disclosure, a system for detecting and tracking virtual containers is provided. The system includes a processor in communication with one or more types of memory. The processor is configured to: detect a virtual container event, create a virtual container record in a database, detect a start event of the virtual container and recording a start time of the start event in the database, detect a stop event of the virtual container and recording a stop time of the stop event in the database, and presenting the database as an event log, so as to enable tracking of software in a plurality of images and in live virtual containers.

The present techniques for detecting and tracking virtual containers provide the advantage of managing a containerized environment by tracking software "at rest" in container images and software "in motion" running in live containers. This visibility provides data to optimize software license spend and mitigate compliance risk.

In additional aspects of the present techniques, collecting the virtual container data may include detecting a start and a stop of the virtual container, recording a start timestamp associated with the start of the virtual container and a stop timestamp associated with the stop of the virtual container, and calculating a usage duration of the virtual container, the usage duration being the difference between the start timestamp and the stop timestamp. This provides the advantage of continued tracking and monitoring of additional virtual containers as they are created, used, modified, and/or destroyed.

Additional aspects of the present techniques may include detecting additional virtual containers, collecting virtual container data for the additional virtual containers, and associating the additional virtual containers with at least one of the plurality of images. This provides the advantage of continued tracking and monitoring of additional virtual containers as they are created, used, modified, and/or destroyed.

Additional aspects of the present techniques may include reporting a licensing violation when it is determined that a license quantity stored in a software license database is exceeded. This provides the advantage of facilitating compliance with software licensing guidelines by a software licensee and compliance monitoring by a software licensor.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

FIG. 6 illustrates a table of an event log according to aspects of the present disclosure;

DETAILED DESCRIPTION

Figure 5:
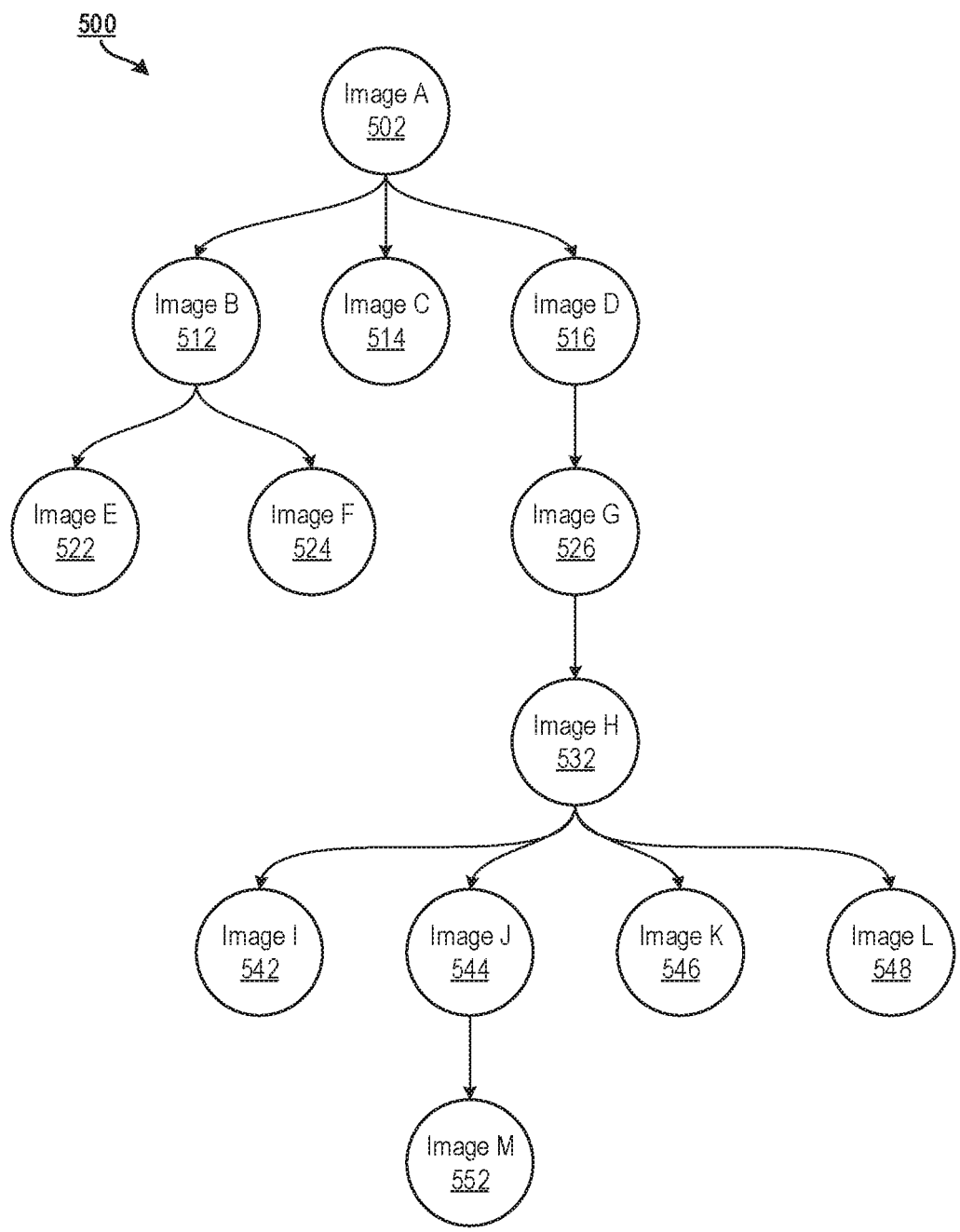
FIG. 5 illustrates a block diagram of a container image history according to examples of the present disclosure.

Various implementations are described below by referring to several examples of detecting and tracking virtual containers. The present techniques build and use a repository of container templates (i.e., images) along with a link to an associated "parent" image. This effectively builds a tree-like structure, an example of which is illustrated in FIG. 5. Inspecting the image history enables a licensing administrator to declare and associate an image with an installable component from a software licensing repository. This link enables the detection and tracking both installation and usage of licensable software components. Utilizing this association enables identifying future images that build off previous images as part of this piece of licensable software.

In some implementations the following advantages may be provided. For example, the present techniques for detecting and tracking virtual containers provide the ability to manage a containerized environment by tracking software "at rest" in container images and software "in motion" running in live containers. This visibility provides data to optimize software license spend and mitigate compliance risk. The present techniques enable the continued tracking and monitoring of additional virtual containers as they are created, used, modified, and/or destroyed. Additionally, the present techniques enable compliance with software licensing guidelines by a software licensee and compliance monitoring by a software licensor. The present techniques also provide for rapid and API driven provisioning, de-provisioning, and auto-scaling, which is especially beneficial when containers can be created, started, stopped, and destroyed frequently and rapidly. Moreover, the present techniques provide a virtual container detection and tracking engine that need not be running on each host computing device executing the virtual containers. This engine collects image IDs across multiple hosts and builds history trees and associations to known installable software components (i.e., images), which relate back to licensable software components. These and other advantages will be apparent from the description that follows.

Figure 1:
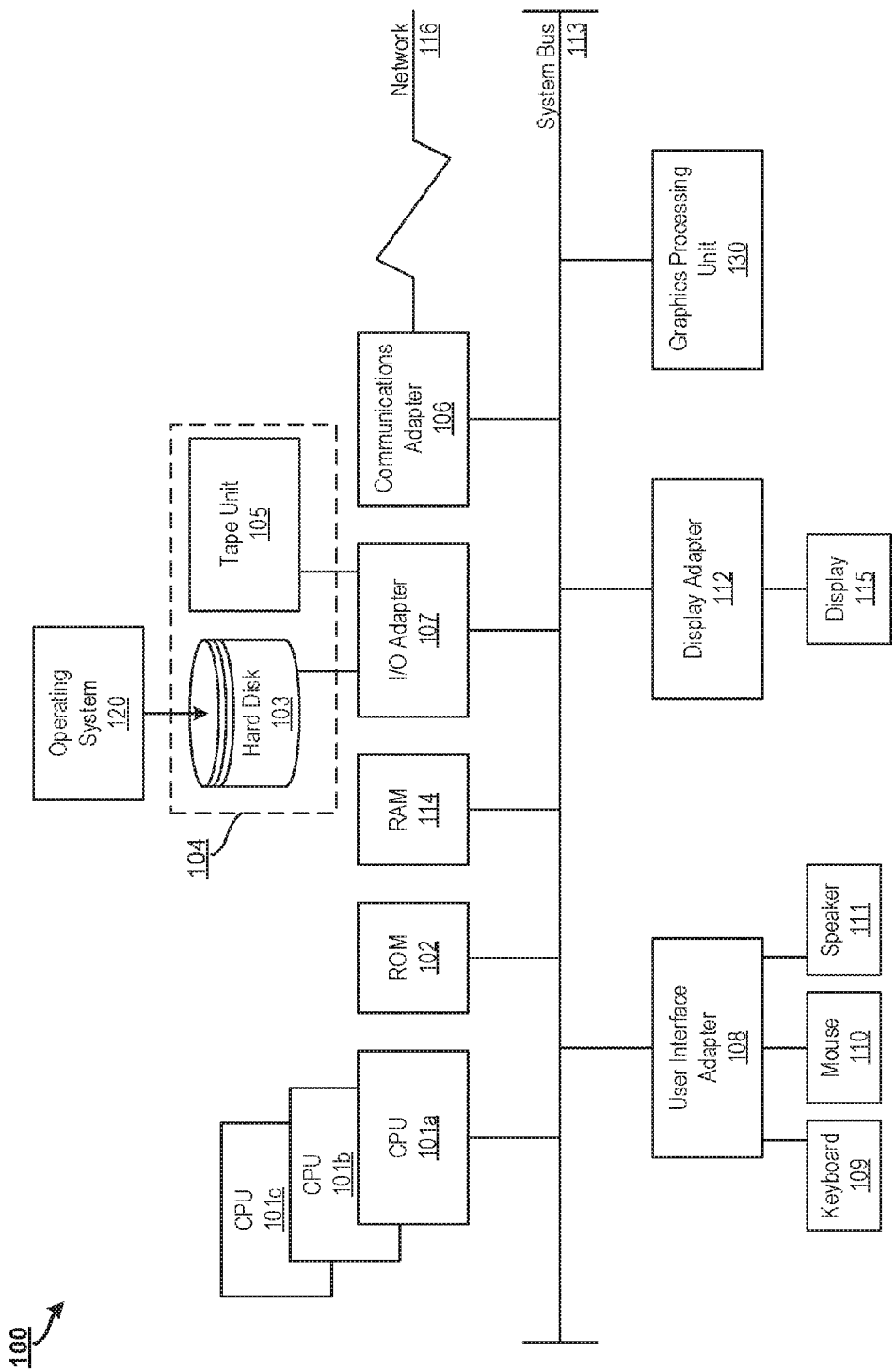
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
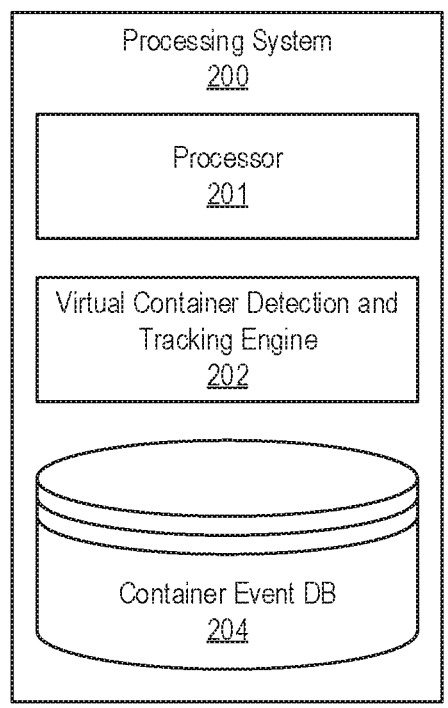
FIG. 2 illustrates a block diagram of a processing system for detecting and tracking virtual containers according to examples of the present disclosure.

FIG. 2 illustrates a block diagram of a processing system for detecting and tracking virtual containers according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 201 for executing those instructions. Thus system memory 114 of FIG. 1 can be said to store program instructions that when executed by processing device 201 implement the engines described herein. Other engines may also be utilized to include other features and functionality described in other examples herein.

Processing system 200 may include processing device 201, virtual container detection and tracking engine 202, and container event database (DB) 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Virtual container detection and tracking engine 202 detects virtual containers, collects virtual container data, associates the virtual container to an image, and builds container event DB 204 using the virtual container data and associations between the virtual container and image. In examples, virtual container detection and tracking engine 202 monitors a container engine of a computing host to detect the virtual containers. Detecting the virtual containers may include detecting a creation event (e.g., the creation of a virtual container) and/or a run event (e.g., the running of a virtual container).

Additionally, virtual container detection and tracking engine 202 collects virtual container data from the container engine of the computing host. In examples, virtual container data may include an image ID, a container ID, an action, an action time, a usage duration, and/or a license quantity.

Virtual container detection and tracking engine 202 also associates the virtual container to an image. To do this, virtual container detection and tracking engine 202 may utilize a container image history that may be built by the virtual container detection and tracking engine 202 or may be preexisting.

Further, virtual container detection and tracking engine 202 builds container event DB 204 using the collected virtual container data and the association between the virtual container and the image. In examples, such a container event DB may be displayed to a user as an event log such as shown in event log 600 of FIG. 6.

Figure 3:
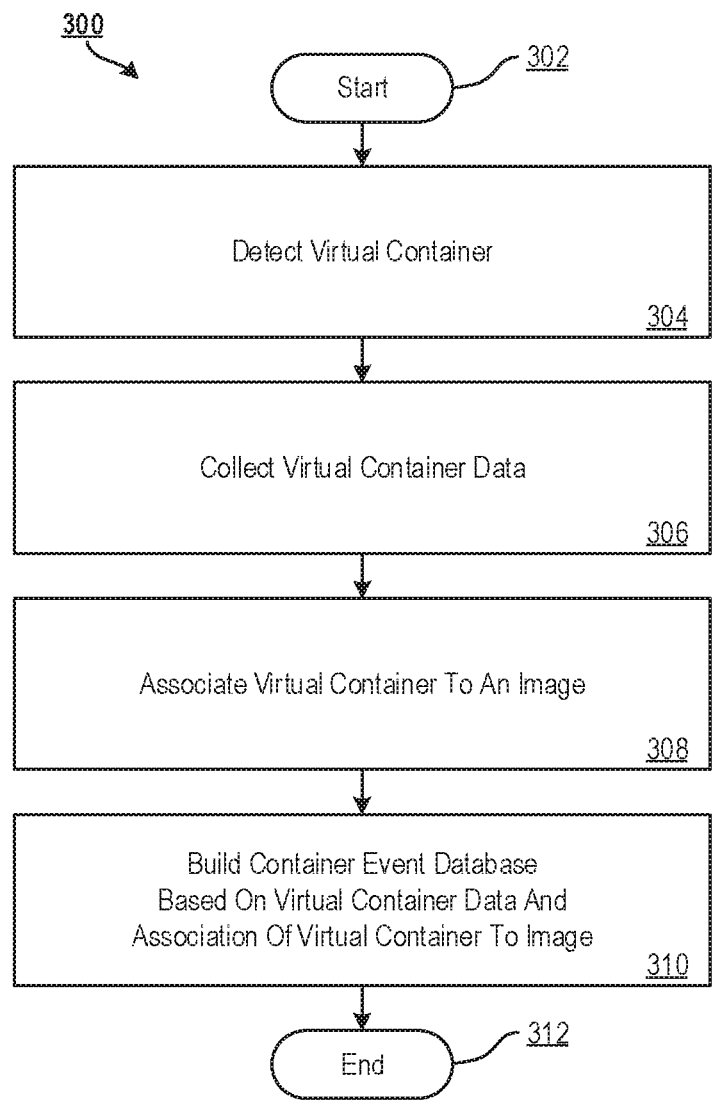
FIG. 3 illustrates a flow diagram of a method for detecting and tracking virtual containers according to examples of the present disclosure.

FIG. 3 illustrates a flow diagram of a method 300 for detecting and tracking virtual containers according to examples of the present disclosure. The method 300 starts at block 302 and continues to block 304

At block 304, the method 300 includes detecting a virtual container. The virtual container may be detected by container engine 202 of processing system 200 of FIG. 2, for example, such as when the virtual container is created. In additional examples, the virtual container may also be detected when it is started.

At block 306, the method 300 includes collecting virtual container data for the virtual container. In examples, collecting the virtual container data may include detecting a start and a stop of the virtual container. Collecting the virtual container data may also include recording a start timestamp associated with the start of the virtual container and a stop timestamp associated with the stop of the virtual container. Additionally, collecting the virtual container data may include calculating a usage duration of the virtual container. The usage duration is the difference between the start timestamp and the stop timestamp and is indicative of how long the virtual container was in use.

In examples, the virtual container data may include at least one of the following: an image ID, a container ID, an action (e.g., create container, start container, stop container, destroy container, etc.), an action time (e.g., the creation time of the container, the start time of the container, the stop time of the container, the destruction time of the container, etc.), a usage duration, and a license quantity (e.g., how many containers are using a license for a particular image).

At block 308, the method 300 includes associating the virtual container to at least one of a plurality of images. In examples, a virtual container may be associated with an image that serves as a predefined container template. That is, the image serves as a base image. New images can be created from the base image.

Figure 4:
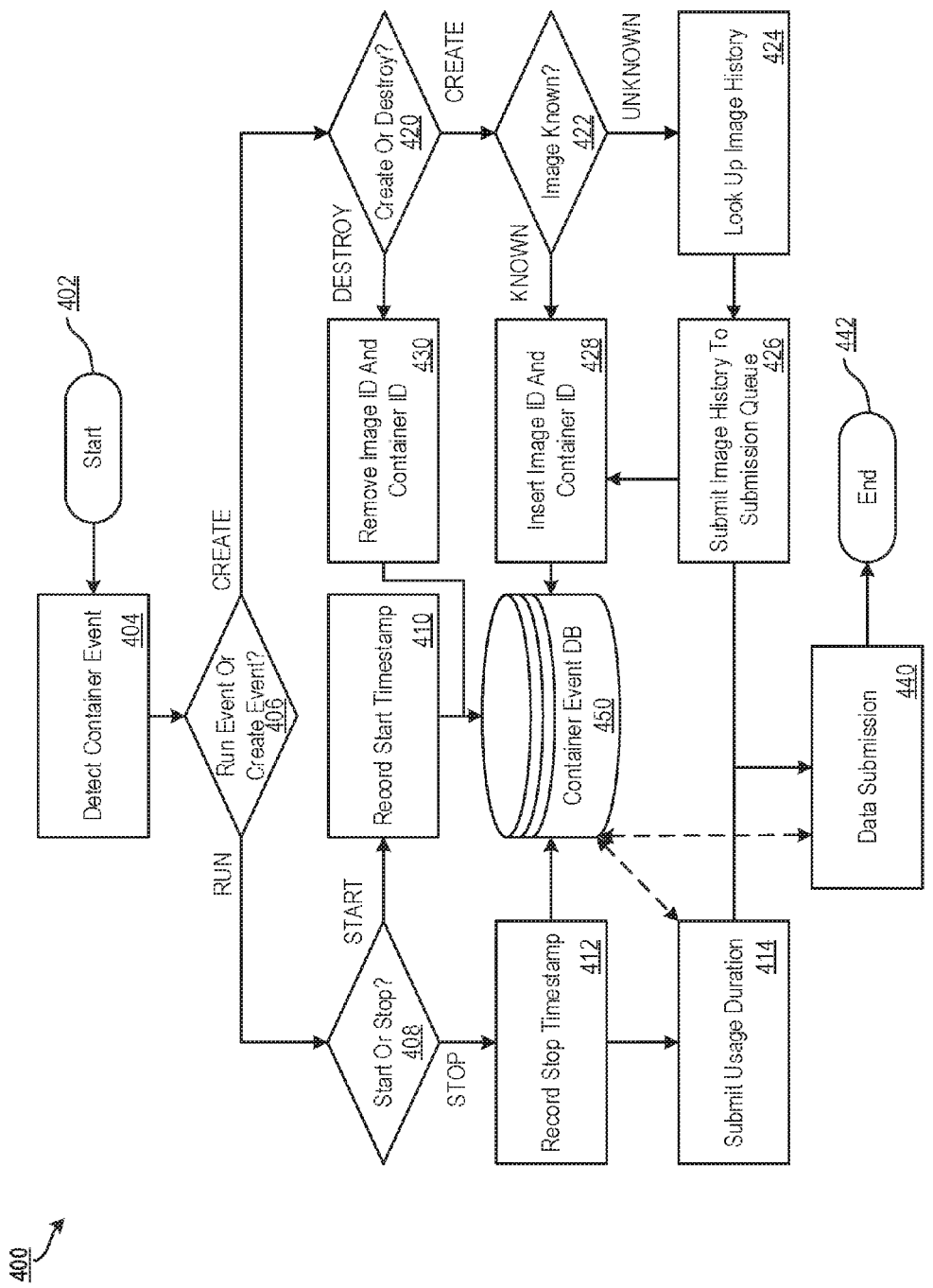
FIG. 4 illustrates a flow diagram of a method for detecting and tracking virtual containers according to examples of the present disclosure.

At block 310, the method 300 includes building a container event database (e.g., container event DB 204 of FIG. 2 or container event DB 450 of FIG. 4). The container event database may be based on the virtual container data and the association of the virtual container to the at least one of the plurality of images. The information contained in the container event database may be represented as an event log (e.g., event log 600 of FIG. 6). In additional examples, the method 300 further comprises building a container image history (e.g., container image history 500 of FIG. 5). The method 300 continues to block 312 and ends.

Additional processes also may be included. For example, the method 300 may include detecting additional virtual containers, collecting virtual container data for the additional virtual containers, and associating the additional virtual containers with at least one of the plurality of images. Additionally, the method 300 may include modifying the container event database based on the virtual container data of the additional virtual containers and the association of the additional virtual containers to the at least one of the plurality of images. In this way, the method 300 may continue to detect and track virtual containers as they are created, utilized, modified, and destroyed.

In yet additional examples, the method 300 may include reporting a licensing violation when it is determined that a license quantity limit stored in a software license database is exceeded. This enables the present techniques to report licensing violations when they occur as opposed to waiting for periodic licensing audits. It should be understood that the processes depicted in FIG. 4 represent illustrations, and that other processes may be added or existing processes may be removed, modified, or rearranged without departing from the scope and spirit of the present disclosure.

FIG. 4 illustrates a flow diagram of a method 400 for detecting and tracking virtual containers according to examples of the present disclosure. The method 400 starts at block 402 and continues to block 404.

At block 404, the method 400 detects a container event such as by monitoring a container engine of a host computing device. At block 406, the method 400 includes determining whether the detected container event is a run event (e.g., a container is run or stopped) or a create event (e.g., a container is created or destroyed).

If a run event is detected at block 406, the method 400 continues to decision block 408 where it is determined whether the run event is a start event or a stop event. If the run event is a start event, the method 400 records a start timestamp at block 410 and stores the start timestamp in container event database (DB) 450. However, if the run event is a stop event, the method 400 records the stop timestamp at block 412 and stores the stop timestamp in container event DB 450. The method 400 then continues to block 414 and submits a usage duration (e.g., the different between the start timestamp and stop timestamp) using information retrieved from container event DB 450. The method 400 then continues to block 440, discussed below.

If a create event is detected at block 406, the method 400 continues to block 420 where it is determined whether the create event is a create event or a destroy event. If the create event is a create event, the method 400 then determines whether an image associated with the virtual container is known or unknown at block 422. If the image is unknown, the method 400 includes looking up the image in an image history (e.g., container image history 500 of FIG. 5) at block 424 and submitting the image history for submission at block 426. After submitting the image history for submission at block 426, or if the image history is determined to be known at block 422, the method 400 creates a virtual container record by inserting the image ID and container ID of the created virtual container into container event DB 450, as shown at block 428. Additionally, after submitting the image history to the submission queue at block 426, the method 400 continues to block 440.

If, at block 420, it is determined that the create event is a destroy event, the method 400 continues to block 430 and removes the image ID and the container ID for the virtual container from container event DB 450.

At block 440, the method 400 includes queuing up data for submission, such as to a software licensing authority or administrator. The data may be presented as event log 600 of FIG. 6. The data is retrieved from container event DB 450. In examples, additional data (such as licensing quantity and mapped components) is included and may be retrieved from a software license database. This data may be used, for example, to relate purchased products to their entitlement and to their installable components. This enables the present techniques to build a relationship between the virtual containers and existing software components in the software license database. This link enables the new virtual container data (along with the image hierarchy and history) and usage data of the virtual containers to be processed like any other software discovery data source. The method 400 continues to block 442 and ends.

Additional processes also may be included, and it should be understood that the processes depicted in FIG. 4 represent illustrations, and that other processes may be added or existing processes may be removed, modified, or rearranged without departing from the scope and spirit of the present disclosure.

FIG. 5 illustrates a block diagram of a container image history 500 according to examples of the present disclosure. Container image history 500 begins with a base image (i.e., image A 502). In examples, image A 502 represents a file system with a first folder. Image B 512, image C 514, and image D 516 are built from image A 502 and may include an addition to image A 502, such as an additional folder or other aspects or features. Image E 522 and image F 524 are built from image B 512.

Continuing from image D 516, image G 526 is built. In examples, image G 526 is built from image D 516 and includes an application such as a WebSphere Liberty application. Image H 532 is built from image G 526. Similarly, image I 542, image J 544, image K 546, and image L 548 are built from image H 532, and image M 552 is built from image J 544.

The connections between the images illustrate the historical development of the images as one image is built from another image. In examples, each of the images has an image ID. As new images are implemented, the new images may be added to the container image history 500.

In examples, the container image history 500 is generated as a composite over time of data generated as a result of collecting virtual container data from multiple processing systems. For example, multiple processing systems (e.g., processing system 200 of FIG. 2), each with virtual container detection and tracking engines, may collect virtual container data, which may be consolidated and used to generate the container image history 500.

FIG. 6 illustrates a table of an event log 600 according to aspects of the present disclosure. Event log 600 may be an example of a visual representation of data stored a container event database as described herein and may contain data relating to virtual containers and images. In particular, the present example of FIG. 6, event log 600 comprises image IDs, container IDs, actions, a time the action occurred, a mapped component, and a license quantity. The image ID represents an ID of the image associated with a detected virtual container, which is represented by the container ID. The action represents the type of action detected (e.g., create, start, stop, destroy, etc.) while the time represents the time the action occurred.

In examples, the mapped component and the license quantity are retrieved from a software license database that stores data relating to software licenses. For example, the software license database may include software that is licensed (i.e., "mapped component") and a license quantity limit (i.e., "license quantity") that indicates the number of licenses that are permissible. The mapped component illustrated in event log 600 represents the licensed product that is utilized by the container, and the license quantity is a total of the number of containers using a particular licensed product.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
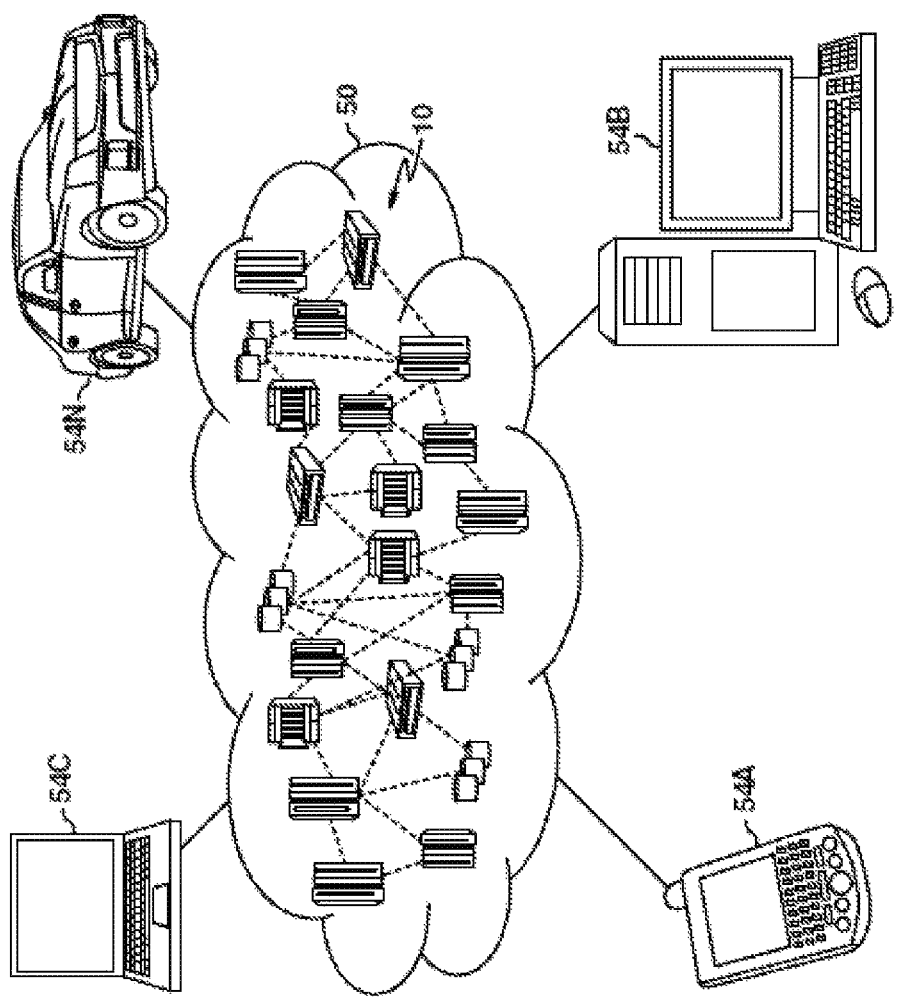
FIG. 7 illustrates a cloud computing environment according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
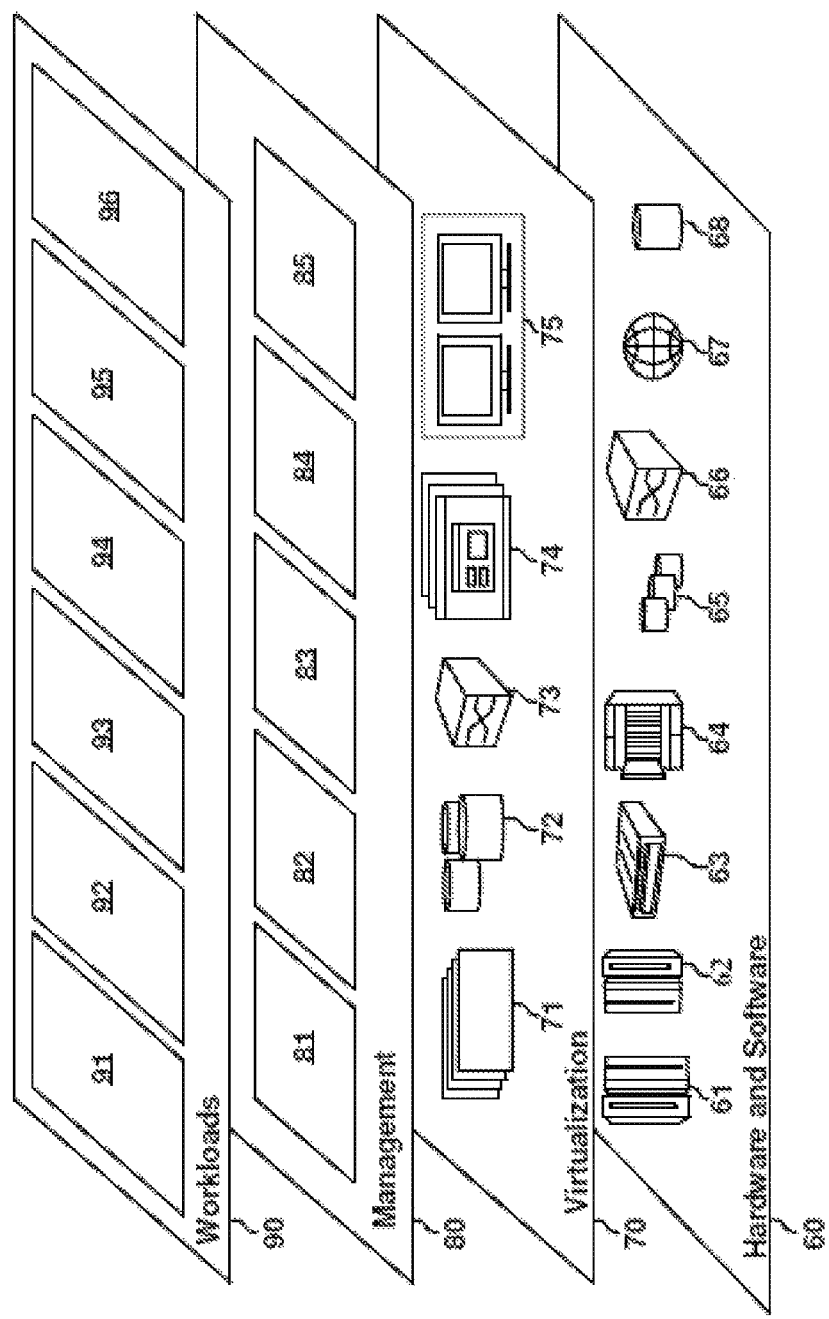
FIG. 8 illustrates abstraction model layers according to examples of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting and tracking virtual containers 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for detecting and tracking virtual containers, the method comprising:
   creating, via a processing device, a virtual container record in a database, wherein the virtual container record relates to a virtual container and wherein each virtual container is configured to run a set of images associated with the respective virtual container, wherein each of the images is derived from a base image so as to be related in a hierarchical tree;
   detecting, by the processing device, a start event of the virtual container and recording a start time of the start event in the database, wherein the start event comprises running the set of images associated with the virtual container such that the virtual container is a live virtual container; and
   detecting, by the processing device, a stop event of the virtual container and recording a stop time of the stop event in the database, wherein the stop event comprises ending the running of the set of images associated with the virtual container such that the virtual container is not a live virtual container.

2. The computer-implemented method of claim 1, further comprising:
   presenting the database as an event log, so as to enable tracking of software in the set of images and in the live virtual container.

3. The computer-implemented method of claim 2, wherein the event log comprises at least one of an image ID, a container ID, an action, an action time, and a usage duration.

4. The computer-implemented method of claim 1, further comprising:
   removing the virtual container record from the database.

5. The computer-implemented method of claim 1, further comprising:
   relating data in the database to data in a software license database to build a relationship between the virtual container and an existing software component in the software license database.

6. The computer-implemented method of claim 5, further comprising:
   reporting a licensing violation when it is determined that a license quantity limit stored in a software license database is exceeded.

7. The computer-implemented method of claim 1, further comprising:
   calculating a usage duration of the virtual container, the usage duration being a difference between the start time of the start event and the stop time of the stop event.

8. A system for detecting and tracking virtual containers, the system comprising:
   a processor in communication with one or more types of memory, the processor configured to:
      create a virtual container record in a database, wherein the virtual container record relates to a virtual container and wherein each virtual container is configured to run a set of images associated with the respective virtual container, wherein each of the images is derived from a base image so as to be related in a hierarchical tree;
      detect a start event of the virtual container and recording a start time of the start event in the database, wherein the start event comprises running the set of images associated with the virtual container such that the virtual container is a live virtual container; and
      detect a stop event of the virtual container and recording a stop time of the stop event in the database, wherein the stop event comprises ending the running of the set of images associated with the virtual container such that the virtual container is not a live virtual container.

9. The system of claim 8, wherein the processor is further configured to:
   present the database as an event log, so as to enable tracking of software in the set of images and in the live virtual container.

10. The system of claim 9, wherein the event log comprises at least one of an image ID, a container ID, an action, an action time, and a usage duration.

11. The system of claim 8, wherein the processor is further configured to:
   remove the virtual container record from the database.

12. The system of claim 8, wherein the processor is further configured to:
   relate data in the database to data in a software license database to build a relationship between the virtual container and an existing software component in the software license database.

13. The system of claim 12, wherein the processor is further configured to:
   report a licensing violation when it is determined that a license quantity limit stored in a software license database is exceeded.

14. The system of claim 8, wherein the processor is further configured to:
   calculate a usage duration of the virtual container, the usage duration being a difference between the start time of the start event and the stop time of the stop event.

15. A computer program product for detecting and tracking virtual containers, the computer program product comprising:
   a non-transitory storage medium readable by a processing circuit and storing instructions for execution by the processing circuit for performing a method comprising:
      creating a virtual container record in a database, wherein the virtual container record relates to a virtual container and wherein each virtual container is configured to run a set of images associated with the respective virtual container, wherein each of the images is derived from a base image so as to be related in a hierarchical tree;
      detecting a start event of the virtual container and recording a start time of the start event in the database, wherein the start event comprises running the set of images associated with the virtual container such that the virtual container is a live virtual container; and detecting a stop event of the virtual container and recording a stop time of the stop event in the database, wherein the stop event comprises ending the running of the set of images associated with the virtual container such that the virtual container is not a live virtual container.

16. The computer program product of claim 15, wherein the method further comprises:

presenting the database as an event log, so as to enable tracking of software in the set of images and in the live virtual container.

17. The computer program product of claim 16, wherein the event log comprises at least one of an image ID, a container ID, an action, an action time, and a usage duration.

18. The computer program product of claim 15, wherein the method further comprises:

removing the virtual container record from the database.

19. The computer program product of claim 15, wherein the method further comprises:

relating data in the database to data in a software license database to build a relationship between the virtual container and an existing software component in the software license database.

20. The computer program product of claim 19, wherein the method further comprises:

reporting a licensing violation when it is determined that a license quantity limit stored in a software license database is exceeded.

* * * * *